United States Patent
Lewis

[11] Patent Number: 6,081,772
[45] Date of Patent: Jun. 27, 2000

[54] PROOFREADING AID BASED ON CLOSED-CLASS VOCABULARY

[75] Inventor: James R. Lewis, Delray Beach, Fla.

[73] Assignee: International Business Machines Corporation, Armonk, N.Y.

[21] Appl. No.: 09/048,715

[22] Filed: Mar. 26, 1998

[51] Int. Cl.[7] .............................. G06F 17/21; G06F 17/24
[52] U.S. Cl. ................................ 704/1; 704/10; 704/270; 707/532; 434/169; 434/185
[58] Field of Search ........................... 704/1, 9, 10, 235, 704/251, 257, 275, 270, 272; 707/530, 531, 532, 533; 434/156, 167, 169, 185

[56] References Cited

U.S. PATENT DOCUMENTS

| | | | |
|---|---|---|---|
| 4,456,973 | 6/1984 | Carlgren et al. ............................ | 704/1 |
| 4,914,704 | 4/1990 | Cole et al. ............................... | 704/235 |
| 4,994,966 | 2/1991 | Hutchins .................................... | 704/9 |
| 5,060,154 | 10/1991 | Duncan, IV ............................ | 707/533 |
| 5,642,519 | 6/1997 | Martin ........................................ | 704/9 |
| 5,678,053 | 10/1997 | Anderson .................................. | 704/1 |
| 5,721,938 | 2/1998 | Stuckey ...................................... | 704/4 |
| 5,799,273 | 8/1998 | Mitchell et al. ........................ | 704/235 |
| 5,799,276 | 8/1998 | Komissarchik et al. ................ | 704/251 |
| 5,909,667 | 6/1999 | Leontiades .............................. | 704/275 |

*Primary Examiner*—Joseph Thomas
*Attorney, Agent, or Firm*—Quarles & Brady LLP

[57] ABSTRACT

A method for proofreading text generated by a speech application can include the following steps beginning with the step of finding all closed-class vocabulary words in the text. Subsequently, the method can include the step of automatically highlighting at least some of the closed-class vocabulary words in the text during proofreading. Additionally, the highlighting of the closed-class vocabulary words can include either highlighting all of the closed-class vocabulary words, highlighting the closed-class vocabulary words based on a perplexity filter, or highlighting the closed-class vocabulary words based on a language model enhancement filter.

9 Claims, 1 Drawing Sheet

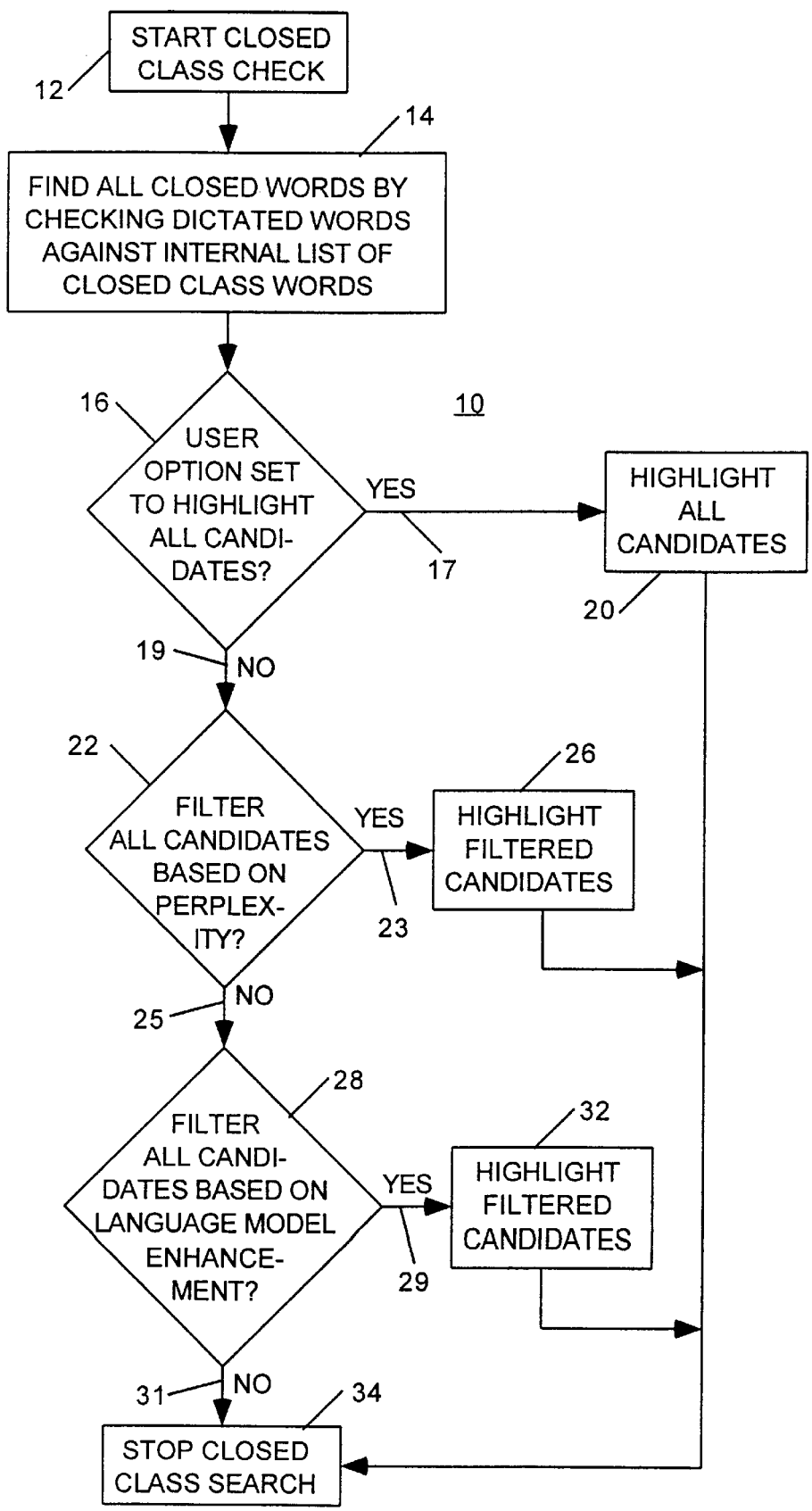

PROOFREADING AID BASED ON CLOSED-CLASS VOCABULARY

BACKGROUND OF THE INVENTION

1. Field of the Invention

This invention relates to the field of speech recognition systems, and in particular, to a proofreading tool for detecting misrecognition of closed-class vocabulary words.

2. Description of Related Art

It is hard for readers of dictated text to detect misrecognitions of function words, that is, words from the closed-class vocabularies. Closed-class vocabulary words include function words, such as determiners, quantifiers, prepositions and the like. Linguists characterize a word as belonging to a closed-class vocabulary, as just described, or as belonging to an open-class vocabulary. Open class vocabulary words include content words, such as nouns, verbs, adjectives and adverbs.

Research in psycholinguistics has shown that these different vocabularies appear to undergo different processing in the brain during language comprehension. In particular, there is a phenomenon known as the "invisibility" effect. The invisibility effect suggests that in some sense, the properties of closed-class words less readily intrude themselves into conscious attention; they tend toward invisibility. One of the properties that tends toward invisibility is the spelling of the closed-class word.

The invisibility effect which characterizes closed-class vocabularies makes misrecognitions of closed-class vocabularies words particularly difficult to detect, or in the metaphor of the invisibility effect, to be noticed. There is a clear need for a tool to improve detection of closed-class vocabulary misrecognitions.

SUMMARY OF THE INVENTION

In accordance with the inventive arrangements, a user's attention is specifically drawn to the closed-class vocabulary function words in dictated text, making it easier for the user to proofread closed-class vocabulary words for errors.

A method for proofreading text generated by a speech application, in accordance with the inventive arrangements, comprises the steps of: finding all closed-class vocabulary words in the text; and, automatically highlighting at least some of the closed-class vocabulary words in the text during proofreading.

The method can comprise the step of highlighting all of the closed-class vocabulary words during the automatic highlighting.

The method can also comprise the step of filtering the closed-class vocabulary words in the text and highlighting only those of the closed-class vocabulary words returned by the filter. The closed-class vocabulary words can be filtered based on perplexity and/or based on language model enhancement.

The method can also comprise the step of highlighting the closed-class vocabulary words in accordance with at least one of a plurality of predetermined rules. At least one of the rules can identify a word selection filter.

The method can also further comprise the step of highlighting the closed-class vocabulary words in accordance with at least one of the following rules: highlighting all of the closed-class vocabulary words; highlighting the closed-class vocabulary words based on a perplexity filter; and, highlighting the closed-class vocabulary words based on a language model enhancement filter. The rules can be user selectable.

BRIEF DESCRIPTION OF THE DRAWINGS

The sole FIGURE is a block diagram of a method in accordance with the inventive arrangements for drawing a proofreader's attention to closed class vocabulary words in dictated text.

DETAILED DESCRIPTION OF THE PREFERRED EMBODIMENTS

A method for drawing a proofreader's attention to closed class vocabulary words in dictated text embodies a set of rules to highlight closed-class words in dictated text during proofreading. A speech recognition application can only select words from one or more lists of words. The words are selected by comparing the base forms of dictated words to the base forms of words in the list or lists. Base forms are descriptions of the pronunciations or sounds of spoken words. The words which are selected may be the wrong words, described herein as misrecognitions, but the selected words are always spelled correctly. Since the words in dictated text are, by definition, spelled correctly, standard spell checking functions are of no value in proofreading.

The number of words in the closed-class vocabularies is very small, typically only a few hundred members in any given language, relative to the infinitely large open-class vocabularies. Thus, it is possible for any given language to build a database of closed-class words. A proofreading tool can use this list together with a set of rules to determine which dictated closed-class words to highlight for review by a user during proofreading of dictated text.

The set of rules or steps can include the following, but is not necessarily limited to those described below. A first rule or step is to highlight all closed-class words in the dictated text. Text can be highlighted, for example, by underlining, by a distinctive color, by a reversal of foreground and background colors, by italics, by bold and by other methods. A second rule is to use the speaker-recognizer's language model, if available, to find and highlight high-perplexity instances of closed class words. High perplexity instances of close-class words include, for example, unlikely or ungrammatical pairs of closed-class words such as "the to" in succession. A third rule or step is to provide additional rules to enhance the language model, or if there is no language model, to replace the language model, taking advantage of the types of misrecognitions likely to occur in speech dictation. A types of misrecognition likely to occur in speech dictation, for example, is confusion between "a" and "the".

A method 10 in accordance with the inventive arrangements and based on the foregoing rules as illustrative of the method, is shown in the flow chart in the sole FIGURE. A closed-class vocabulary check is started in accordance with the step of block 12. After the check is started, all of the closed-class words are located by checking the dictated words against an list or lists of closed-class words in accordance with the step of block 14.

After the closed-class vocabulary words have been found, the user is prompted to choose whether or not to highlight all of the closed-class vocabulary words in accordance with decision block 16. If the user chooses yes, the method branches on path 17 to block 20, in accordance with which all of the closed-class vocabulary words are highlighted. If the user chooses no, the method branches on path 19 to decision block 22.

In accordance with decision block 22, the user is prompted to choose whether or not to filter and highlight the closed-class vocabulary words based on perplexity. If the user chooses yes, the method branches on path 23 to block 26, in accordance with which the closed-class vocabulary words are filtered and highlighted on the basis of perplexity. If the user chooses no, the method branches on path 25 to decision block 28.

In accordance with decision block 28, the user is prompted to choose whether or not to filter and highlight the closed-class vocabulary words based on language model enhancement. If the user chooses yes, the method branches on path 29 to block 32, in accordance with which the closed-class vocabulary words are filtered and highlighted based on language model enhancement. If the user chooses no, the method branches on path 31 to block 34.

The closed-class check initiated in the step of block 12 is stopped in accordance with the step of block 34. The step of block 34 also follows each of the steps in blocks 20, 26 and 32.

It will be appreciated that the different user options need not be presented in that order, and in fact, can be presented to the user at the same time, for example in a single drop down menu.

A user interface, which can be partly graphical, audio or partly graphical and partly audio, can provide a default set of rules but can allow users to indicate which rule or rules best suit the user's dictation and proofreading style. The interface can include the drop down menu, for example, as explained above.

It is difficult for people to proofread for misrecognitions that occur in words that are members of the closed-class vocabularies. This invention describes a method for a proofreading tool that focuses a user's attention on these words, make it easier to proofread them accurately.

What is claimed is:

1. A method for proofreading text generated by a speech application, consisting of the steps of:

finding all closed-class vocabulary words in said text; and, automatically highlighting only said closed-class vocabulary words in said text during proofreading.

2. The method of claim 1, wherein the step of highlighting highlights only all of said closed-class vocabulary words.

3. The method of claim 1, wherein the step of finding is based on a filtering step of said closed-class vocabulary words in said text and the step of highlighting highlights only those of said closed-class vocabulary words returned by said filtering.

4. The method of claim 3, wherein the step of filtering said closed-class vocabulary words is based on perplexity.

5. The method of claim 3, wherein the step of filtering said closed-class vocabulary words is based on language model enhancement.

6. The method of claim 1, wherein the step of highlighting said closed-class vocabulary words is in accordance with at least one of the following rules:

highlighting all of said closed-class vocabulary words;

highlighting said closed-class vocabulary words based on a perplexity filter; and, highlighting said closed-class vocabulary words based on a language model enhancement filter.

7. The method of claim 6, wherein said rules are user selectable.

8. The method of claim 1, wherein the step of highlighting said closed-class vocabulary words is in accordance with at least one of a plurality of predetermined rules.

9. The method of claim 8, wherein at least one of said rules identifies a word selection filter.

* * * * *